March 19, 1957 J. B. DICK 2,785,585
REMOTE CONTROL GEAR SHIFT NEUTRALIZER
Filed July 16, 1953
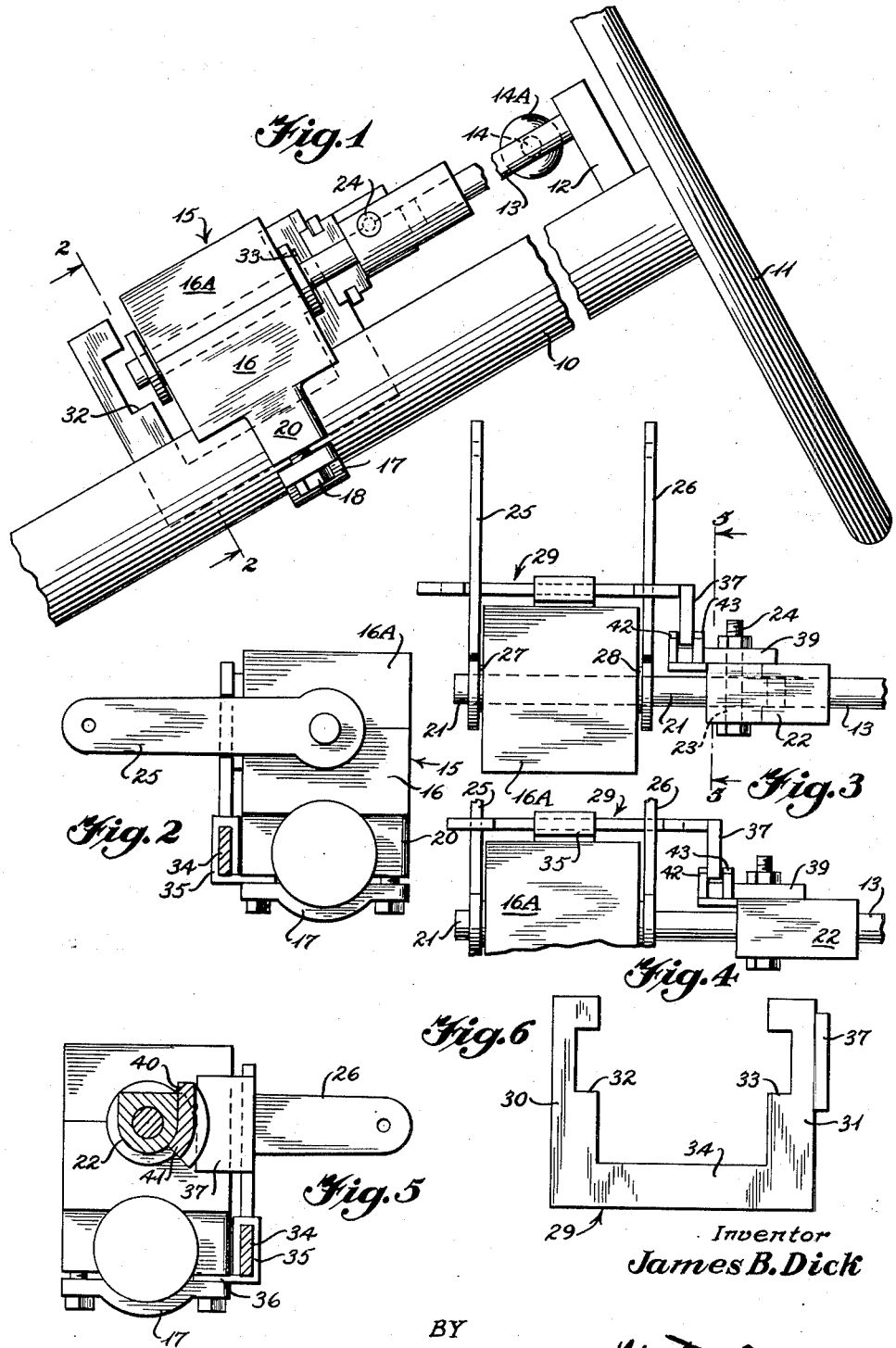
Inventor
James B. Dick
BY

United States Patent Office 2,785,585
Patented Mar. 19, 1957

2,785,585

REMOTE CONTROL GEAR SHIFT NEUTRALIZER

James B. Dick, Birmingham, Ala.

Application July 16, 1953, Serial No. 368,276

7 Claims. (Cl. 74—484)

This invention relates to a control in which a single lever operates more than one instrumentality. It more particularly relates to a gear shifting control in an automobile for changing from one gear to another by means of a single operating handle.

Heretofore it has been conventional practice in automobiles to provide a single shifting lever for changing from one gear to another and in the last fifteen years the gear shifting lever has been mounted on the steering column of an automobile for convenient accessibility and to avoid objectionable projections on the floor of an automobile.

Although these steering column mounted gear shift controls have been in use for some time the operation thereof has not been entirely satisfactory. The gear shifting lever is normally held in a position to shift from high to second gear and, especially after an automobile has been in use for some time, and wear occurs, it is possible for the linkage connecting the low and reverse to slip out of its neutral position into the low gear position. However, the operating handle under these circumstances is in the position to shift from neutral to high or second gear, but since the gear in the transmission is already in low, it is impossible to shift the shifting lever into either the high or second position until after the linkage for operating the low and reverse gear is returned to its neutral postion. This difficulty has occurred in a number of popular makes of automobiles especially after many miles of use and occasionally happens in new automobiles.

An object of the present invention is to overcome the disadvantages enumerated above and to positively prevent the "locking" of the control lever.

A further object of the invention is to provide an attachment which may be applied to existing automobiles with a minimum of time and a minimum of skilled labor and which is inexpensive to manufacture.

Another object of the invention is to provide a positive means on the exterior of the gear shift control housing for positively preventing more than one lever from being operated at one time.

Another object of the invention is to provide a structure which operates so as to be readily observed by the purchaser for demonstration and sales purposes.

Briefly the invention involves a U-shaped frame having inwardly opening notches on the legs thereof and guide means mountable on the supporting structure for maintaining the U-frame in position for selective interengagement of the notches therein with the usual gear shift arms of the gear shift control box and means being provided for moving the U-shaped plate from engagement with one actuating arm or the other by means moved directly by the conventional gear shift control lever so that the notches receive the inactive gear shifting arm and prevent undesired movement.

Further objects and advantages of the invention will be apparent from the following description taken in conjunction with the drawings wherein:

Figure 1 is an elevation with parts broken away of a steering column of an automobile with the control lever mounted thereon and the present invention applied to the conventional control box.

Figure 2, a section taken substantially on line 2—2 of Figure 1 with parts omitted for clearness;

Figure 3, a top plan view of the control structure with the steering column and other parts omitted for simplicity;

Figure 4, a fragmentary view similar to Figure 3 showing the U-shaped frame in position locking the second and high gear shift control arm from movement and permitting movement of the low and reverse gear shift arm;

Figure 5, a section taken on line 5—5 of Figure 3;

Figure 6, an elevation of the U-shaped frame.

Referring more specifically to the drawing the usual steering column 10 of an automobile carries a conventional steering wheel 11 for guiding a vehicle and a bracket 12 secured to the steering column slidably and rotatably supports a control shaft 13 upon which is mounted the usual gear shift control lever 14 with a knob 14A at its extremity. A gear shift control box 15 includes a body 16 and a cover 16A removably secured thereto by screws or other fastening means (not shown). The gear shift control box is fixed to the steering column 10 by means of the usual strap 17 affixed to the body 16 by means of bolts 18 threaded into downwardly extending lugs 20.

An extension of control shaft 13 which is shown as a stub shaft 21 is connected by means of a coupling 22 affixed to the lower end of control shaft 13 and has an eccentrically located transverse bore 23 extending therethrough.

The stub shaft 21 is provided with a transverse keyway for receiving a bolt 24 which passes through bore 23 and positively secures the coupling 22 and the control shaft 13 to the stub shaft 21 in a conventional manner. It will be apparent that stub shaft 21 and control shaft 13 may be a single shaft.

Pivotally mounted on the gear shift control box are gear shift arms 25 and 26 fixed to collars 27, 28, respectively, which collars are rotatably mounted in bearings formed by the body 16 and the cover 16A. The stub shaft 21 is rotatably mounted within the collars 27 and 28 and carries within the box 15 the usual projecting lug (not shown) for engaging the more or less conventional fork (not shown) secured to the collars 27 and 28 for selectively operating gear shift arms 25 and 26. Since this construction is conventional and may take various forms it is not shown in detail, but it may be noted that in the usual form the usual lug on the stub shaft 21 engages the fork or equivalent on the collar 27 and is maintained in this position by a coil spring thereby maintaining the gear shift knob 14A in the position shown for shifting arm 25 from high to second and with the collar 28 free to move without moving gear shift knob 14A.

Gear shift arm 26 controls the operation of gears for the low and reverse ratios and therefore it is possible in existing automobiles for the control knob to be in its neutral position and the lug on stub shaft 21 to be in engagement with the fork on collar 27 and if the vehicle should receive a jolt such as a bump, when coasting in neutral, for example, the gear shift arm 26 may drop downwardly putting the transmission in low. Consequently when the operator wishes to proceed it is impossible to move the control knob 14A since gear shift arm 25 cannot move because the interconnecting means in the transmission prevents operation thereof while the transmission is in the "low" ratio. To overcome this defect it is necessary for the operator to stop the automobile, raise the hood, and lift up control arm 26 to its neutral position thereby permitting the control knob 14A to operate control shaft 13 for selecting the desired gear ratio in the normal manner.

The present improvement comprises a U-shaped frame or plate 29 having legs 30 and 31 provided with notches 32 and 33 for receiving gear shift arms 25 and 26 respectively. The bight portion 34 of U-frame 29 is substantially rectangular in cross section and is embraced by a guide-way 35 which permits sliding movement of the U-shaped frame 29. A laterally projecting supporting flange 36 extends from the guideway 35 and is secured between a lug 20 and the strap 17 by means of a bolt 18 for fixedly maintaining the guideway in position for obtaining rectilinear movement of frame 29 in a path substantially parallel to the control shaft 13.

It will be noted that the U-shaped frame is located so that notches 32 and 33 may selectively receive gear shift arms 25 and 26 respectively for preventing movement of the received arm.

Fixed to the outer edge of leg 31 of the U-frame 29 is a flange 37 projecting laterally toward and terminating short of the axis of the control shaft 13.

A member 39 having a relatively flat body portion 40 engaging the flat edge of coupling 22 and a curved portion 41 engaging the circular portion of coupling 22 is fixed to the coupling by means of the bolt 24 in a conventional manner. It will be noted that the curved portion 41 along with the single bolt 24 serves to positively maintain the member in a fixed position on the coupling. An arcuate channel is formed by webs 42 and 43 affixed to the member 39 and providing an arcuate shaped channel for positive interengagement with flange 37 whereby axial movement of control shaft 13 produces corresponding parallel rectilinear movement of the U-shaped frame 29.

From the above it will be obvious that the U-shaped frame 29 is normally in the position shown in Figs. 1 to 3 in the drawing and notch 33 thereof receives gear shift arm 26 and positively prevents pivotal motion thereof and since the control lever 14 is normally in the position for shifting from high to low it will be obvious that the present invention overcomes the difficulty experienced in the conventional construction. When it is desired to shift into the low or reverse ratios, the control shaft 13 is moved axially bringing U-shaped frame 29 to its upper portion, shown in Figure 4, thereby locking gear shift arm 25 from movement and permitting gear shift arm 26 to be operated in the usual manner.

The present invention is adaptable to other forms of mechanism for moving gear shift arms regardless of whether the mechanism within the gear shift control box is the same as that described or materially different since the sliding frame 29 is suitable for mounting upon many other types of construction. It is also contemplated that a control frame could be pivotally mounted for obtaining the desired interengagement of gear shift arm and control plate to prevent the difficulty described above, in such case suitable means would be provided to move the control frame from the control shaft.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. For use with an automobile equipped with a steering column, a control shaft mounted on the steering column for sliding and rotating movement with an operating handle therefor, a gear shift control box having gear shift arms extending therefrom and controlled by the operating handle for selectively moving one of said gear shift arms at a time, and a fastening bolt connecting said control box to said steering column, the improvement comprising a U-shaped frame with the clearance between the legs approximately the same as the distance between said gear shift arms, each of said legs being provided with a notch for receiving the adjacent gear shift arm so that one gear shift arm may be engaged in one notch while the other gear shift arm is free to move, the bight portion of the said U-shaped frame being of substantially rectangular section, a guideway having a substantially rectangular opening for slidably receiving the bight portion of the U-shaped frame, a laterally extending flange on said guide for mounting said guide on the gear shift control box by the fastening bolt, said parts being so arranged as to permit sliding movement of the U-shaped frame when the gear shift arms are in neutral positions, a member operably attached to the control shaft and including an arcuate channel formed therein with the axis of the arcuate channel substantially the same as the axis of the control shaft said U-shaped frame being provided with a flange for reception in the arcuate channel of the member whereby axial sliding movement of the control shaft moves the U-shaped frame in the same direction, whereby only the selected single gear shift arm may be moved and such selected single gear shift arm will be the one which is positively connected to the control shaft.

2. For use with an automobile equipped with a steering column, a control shaft mounted on the steering column for sliding and rotating movement with an operating handle therefor and a gear shift control structure having gear shift arms extending therefrom and controlled by the operating handle for selectively moving one of said gear shift arms, the improvement comprising a frame with a dimension approximately the same as the distance between said gear shift arms, at least two opposite edges of said frame being provided with a notch for receiving the adjacent gear shift arm so that one gear shift arm may be engaged in one notch while the other gear shift arm is free to move, means for mounting said frame for transverse movement with respect to said arms, said parts being so arranged as to permit movement of frame when the gear shift arms are in neutral positions, a member attached to the control shaft and positive means providing inter-engagement of said member and said frame whereby axial movement of the control shaft moves the frame in the same direction, whereby a single gear shift arm may be moved and such single gear shift arm will be the one which is positively connected to the control shaft.

3. For use with an automobile equipped with a steering column, a control shaft mounted on the steering column for sliding and rotating movement with an operating handle therefor and a gear shift control structure having gear shift arms extending therefrom and controlled by the operating handle for selectively moving one of said gear shift arms, the improvement comprising a frame for movement transversely of at least one gear shift arm, said frame being provided with at least one notch for receiving the said at least one gear shift arm so that said gear shift arm may be engaged in said notch while the other gear shift arm is free to move, means for mounting said frame on the structure for transverse movement toward and from said at least one gear shift arm, said parts being so arranged as to permit movement of the frame when the said at least one gear shift arm is in its neutral position, a member operably attached to the control shaft and including an arcuate channel formed therein with the axis of the arcuate channel substantially the same as the axis of the control shaft said frame being provided with a flange for reception in the arcuate channel of the member whereby axial movement of the control shaft moves the frame in the same direction and the said at least one gear shift arm may be moved only when the said at least one gear shift arm is positively connected to the control shaft.

4. For use with an automobile equipped with a steering column, a control shaft mounted on the steering column for sliding and rotating movement with an operating handle therefor and a gear shift control structure having gear shift arms extending therefrom and controlled by the operating handle for selectively moving one of said gear shift arms, the improvement comprising a frame for movement transversely of at least one gear shift arm, said frame being provided with at least one notch for receiving the said at least one gear shift arm so that said gear shift arm may be engaged in said notch while the other gear shift arm is free to move, means for mounting said frame on the structure for transverse movement toward and from said at least one gear shift arm, said parts being so arranged as to permit movement of the frame when the said at least one gear shift arm is in its neutral position, and means for positively inter-connecting said control shaft and said frame whereby axial movement of the control shaft moves the frame in the same direction and the said at least one gear shift arm may be moved only when the said at least one gear shift arm is positively connected to the control shaft.

5. In an automobile including a steering column, a gear shift control box having a pair of gear shift control arms extending therefrom, and a gear shifting lever mounted on said column, means for preventing locking of the gear shifting lever comprising a U-shaped plate having notches formed on the inner edge of each leg and a projecting flange extending from one side thereof, a guide surrounding the bight portion of the U-shaped plate providing sliding movement of the plate relative to the guide, means for mounting the guide on the gear shift control structure so that one notch of the plate may engage one control arm to prevent operation thereof permitting operation of the other control arm and the other notch may engage the other control arm permitting operation of the said one control arm, a member for attachment to the control shaft and including a channel of arcuate configuration for embracing the flange of the U-plate whereby axial movement of the control shaft will result in sliding movement of the U-plate.

6. For use with an automobile equipped with a steering column, a control shaft mounted on the steering column for sliding and rotating movement with an operating handle therefor and a gear shift control structure having gear shift arms extending therefrom and controlled by the operating handle for selectively moving one of said gear shift arms, the improvement comprising a frame for movement transversely of at least one gear shift arm, said frame being provided with at least one notch for receiving the adjacent gear shift arm so that said gear shift arm may be engaged in said notch while the other gear shift arm is free to move, means for mounting said frame on the structure for transverse movement toward and from said at least one gear shift arm, said parts being so arranged as to permit movement of the frame when the said at least one gear shift arm is in its neutral position, and means for positively inter-connecting said control shaft and said frame whereby axial movement of the control shaft moves the frame so that said at least one gear shift arm only may be moved when the said at least one gear shift arm is positively connected to the control shaft.

7. For use with an automobile equipped with a steering column, a control shaft mounted on the steering column for sliding and rotating movement with an operating handle therefor and a gear shift control structure including a housing box and having gear shift arms extending therefrom and controlled by the operating handle for selectively and positively moving one of said gear shift arms, the improvement comprising a frame slidably mounted on the box for movement transversely of at least one gear shift arm, said frame being provided with at least one arm engaging edge for positive cooperation with said at least one arm to prevent movement of said at least one arm in one direction, means operatively connecting said frame to said operating handle for positive movement of said frame toward and away from said one control arm whereby said one control arm may be selectively prevented from movement in said one direction or may be permitted to move in either direction.

References Cited in the file of this patent

UNITED STATES PATENTS

| | | |
|---|---|---|
| 2,185,830 | Burt | Jan. 2, 1940 |
| 2,301,484 | Wahlberg | Nov. 10, 1942 |
| 2,598,428 | Plexico | May 27, 1952 |

FOREIGN PATENTS

| | | |
|---|---|---|
| 966,844 | France | Oct. 19, 1950 |